United States Patent [19]

Zucker et al.

[11] Patent Number: 4,968,944

[45] Date of Patent: Nov. 6, 1990

[54] APPARATUS FOR DETECTING MALFUNCTIONS OF A SINGLE ELECTRICAL DEVICE IN A GROUP OF ELECTRICAL DEVICES, AND METHODS OF CONSTRUCTING AND UTILIZING SAME

[75] Inventors: Myron Zucker, Bloomfield Hills, Mich.; Michael Z. Lowenstein, Lakewood, Colo.; Ronald G. Jawernycky, Farmington Hills, Mich.

[73] Assignee: Myron Zucker, Inc., Royal Oak, Mich.

[21] Appl. No.: 196,369

[22] Filed: May 19, 1988

Related U.S. Application Data

[63] Continuation-in-part of Ser. No. 110,115, Oct. 19, 1987, Pat. No. 4,849,849.

[51] Int. Cl.$^5$ ............................................. G01R 31/02
[52] U.S. Cl. .................................... 324/537; 324/509; 324/522; 324/127; 361/93
[58] Field of Search ................ 324/500, 509, 510, 522, 324/525, 537, 555, 424, 548, 549, 127; 361/94, 97, 87, 91, 93

[56] References Cited

U.S. PATENT DOCUMENTS

| | | | |
|---|---|---|---|
| 4,419,621 | 12/1983 | Becker et al. | 324/548 |
| 4,425,541 | 1/1984 | Burkum et al. | 324/548 |
| 4,429,340 | 1/1984 | Howell | 361/94 X |
| 4,434,401 | 2/1984 | York | 324/537 X |
| 4,536,704 | 8/1985 | Burkum et al. | 307/241 X |
| 4,539,618 | 9/1985 | Stich | 361/94 |
| 4,540,935 | 9/1985 | Burku et al. | 324/548 |
| 4,605,982 | 8/1986 | Harner et al. | 361/94 |
| 4,751,605 | 6/1988 | Mertz et al. | 340/870.29 |

OTHER PUBLICATIONS

Information Data Packet from Smith Research & Technology, Inc., Mar. 1988.

*Primary Examiner*—Reinhard J. Eisenzopf
*Assistant Examiner*—Robert W. Mueller
*Attorney, Agent, or Firm*—Irving M. Weiner; Robert M. Petrik; Joseph P. Carrier

[57] ABSTRACT

Apparatus for detecting and indicating malfunctions of single electrical device in a group of electrical devices. The apparatus comprises an inductor connected to a common output of a group of electrical devices for providing an input signal corresponding to electrical energy in the group of electrical devices, a comparator connected to the inductor and receiving the input signal therefrom, the comparator functions to provide a default signal when at least one of the electrical devices malfunctions, a detector connected to the comparator for receiving the default signal therefrom, a timer connected to the comparator and the detector, the timer being actuated upon receipt of the default signal from the comparator and functioning to provide a timer signal to the detector means a predetermined time thereafter, and an indicator connected to the detector and being operated in response to an enable signal received therefrom. The detector povides the enable signal to the indicator only when it receives the default signal from the comparator simultaneously with the timer signal from the timer.

20 Claims, 3 Drawing Sheets

APPARATUS FOR DETECTING MALFUNCTIONS OF A SINGLE ELECTRICAL DEVICE IN A GROUP OF ELECTRICAL DEVICES, AND METHODS OF CONSTRUCTING AND UTILIZING SAME

This application is a continuation-in-part of U.S. patent application No. 110,115 filed Oct. 19, 1987, now U.S. Pat. No. 4,849,849.

BACKGROUND OF THE INVENTION

1. Field of the Invention

The invention relates generally to apparatus for detecting malfunctions of even a single electrical device in a whole group of electrical devices, and methods of constructing and utilizing same. More particularly, the present invention relates to a monitoring instrument which is connectable to a group of electrical devices for detecting when one or more of the electrical devices in the group is malfunctioning, and for providing an indication of such malfunction.

2. Description of the Relevant Art

There are known instruments which can be used to detect malfunctions of a single electrical device in a group of electrical devices. For example, U.S. Pat. No. 4,419,621 discloses a "monitoring system for the capacitor batteries of a three-phase filter circuit." The disclosed, patented system is specifically designed to monitor the magnitude and phase of the fundamental frequency components of current flowing from a Y-circuit node by which the individual capacitor batteries are coupled to one another, and to evaluate any variations of the fundamental frequency components to specifically identify defective sectional capacitors.

The patented system has many disadvantages associated therewith. For example, the disclosed system is based on a fairly complex electrical circuit whereby it has a relatively high cost. Further, the patented system does not include its own power supply (or is based on internal current signaling), whereby it cannot be used on many electrical devices, such as metalized-type devices, which do not short out when they malfunction. Also, it would be difficult and impractical to use the disclosed instrument for monitoring a large number of electrical devices because of its complexity.

There are also known instruments, such as disclosed in copending application U.S. Ser. No. 110,115, which can be used to monitor/indicate when a single electrical device has malfunctioned. However, such an instrument is required to be associated with (or monitor) only a single electrical device, so that if a large number of electrical devices were grouped together, such as in a switched bank, then each of the electrical devices would have its own monitoring instrument. Obviously, the use of many monitoring instruments in relation to a large group of electrical devices can be undesirably cumbersome and expensive.

Further, there are known instruments for identifying specific, defective electrical devices which are grouped together with similar electrical devices during normal use. For example, U.S. Pat. No. 4,425,541, 4,536,704 and 4,540,935 disclose several related instruments for identifying defective electric power distribution capacitors. Each of the instruments disclosed in these patents includes a power supply for supplying an alternating current to a de-energized capacitor while the capacitor is still installed in a bank of capacitors and a measurement device for measuring the magnitude of electric current entering the capacitor to thereby determine if it is functioning properly. The disclosed instruments are used by utility company linemen, for example, to accurately determine which specific capacitors (if any) in a bank of capacitors are defective. In use, the linemen must initially disconnect a three-phase capacitor bank from a high voltage line by opening line switches and capacitor fuse protectors, waiting a period of time for the capacitor bank to discharge through internal resistors, and then take a reading of each individual capacitor to determine if it is defective. Such known instruments are quite useful and could, in fact, be used in addition to the present invention. Particularly, the present invention only functions to indicate that there is a malfunction of one or more electrical devices in a group. Once such an indication is made an operator would have to specifically identify/replace which one(s) of the electrical devices are defective, and could do so using the discussed, known instruments. It will be understood, however, that use of the discussed, known instruments is relatively time consuming or labor intensive, whereby use of such known instruments to simply, initially determine if there is a malfunction of any electrical device in a group of the electrical devices can be unnecessarily and undesirably expensive.

Additionally, there are known instruments which monitor both an overload condition and a light-load condition of a single electrical device, such as an induction motor. For example, such an instrument is disclosed in U.S. Pat. No. 4,541,029. As indicated, the disclosed instrument is not intended or constructed for use in monitoring when a single electrical device in a group of electrical devices malfunctions. Moreover, the disclosed instrument is based on a relatively complex circuit and could not be easily or practically adapted for use in monitoring when a single electrical device in a group of electrical devices malfunctions.

Conventional monitoring and testing instruments, including those discussed above, have many problems and disadvantages associated therewith, and have as a whole failed to fulfil a need in the art for a simple monitoring/indicating instrument which can be easily used in association with large groups of electrical devices to provide a simple, initial indication when one or more of the electrical devices in the group has malfunctioned.

SUMMARY OF THE INVENTION

The present invention has been developed to overcome the above discussed limitations and disadvantages of known monitoring and testing instruments, and to thereby satisfy a great need in the art.

According to the present invention there is provided an apparatus for detecting malfunctions of a single electrical device in a group of electrical devices. The apparatus comprises an inductive means connected to a group of electrical devices for providing an input signal corresponding to electrical energy in the group of electrical devices, a comparator means connected to the inductive means and receiving the input signal therefrom, the comparator means providing a default signal when at least one of the electrical devices malfunctions, detector means connected to the comparator means and receiving the default signal therefrom, timer means connected to the comparator means and the detector means, and indicator means connected to the detector means and receiving an enable signal therefrom. The timer means is actuated upon receiving the default signal from the comparator means, and provides a timer signal to the detector means a predetermined time thereafter. The detector means provides the enable signal to the indicator means only when it simultaneously receives the default signal from the comparator means and the timer signal from the timer means.

It is an object of the present invention to provide a monitoring/indicating instrument which simply and reliably indicates when one or more electrical devices in a group of commonly connected electrical devices has malfunctioned.

It is another object of the present invention to provide such a monitoring/indicating instrument which is based on a relatively simple circuit and which can be easily connected to a common connection of the group of electrical devices.

It is yet another object of the present invention to provide such a monitoring/indicating instrument which can be connected to several groups of electrical devices, each group of devices being selectively actuatable at any given time, and which can provide a reliable indication when one or more electrical device in any of the groups malfunctions.

It is still another object of the present invention to provide such a monitoring/indicating instrument which can be easily and rapidly adapted for use with many different groups of electrical devices.

Also, it is an object of the invention to provide such a monitoring/indicating instrument which will not be falsely triggered, such as during start-up/shutdown of the electrical devices, and which will provide a positive indication of temporary malfunctions in any one of the electrical devices if such temporary malfunctions persist for a sufficient, predetermined time period.

Other objects, advantages and salient features of the present invention will become apparent from the following detailed description, which, when taken in conjunction with the annexed drawings discloses preferred embodiments of the present invention.

DETAILED DESCRIPTION OF PREFERRED EMBODIMENTS

Figure 2:
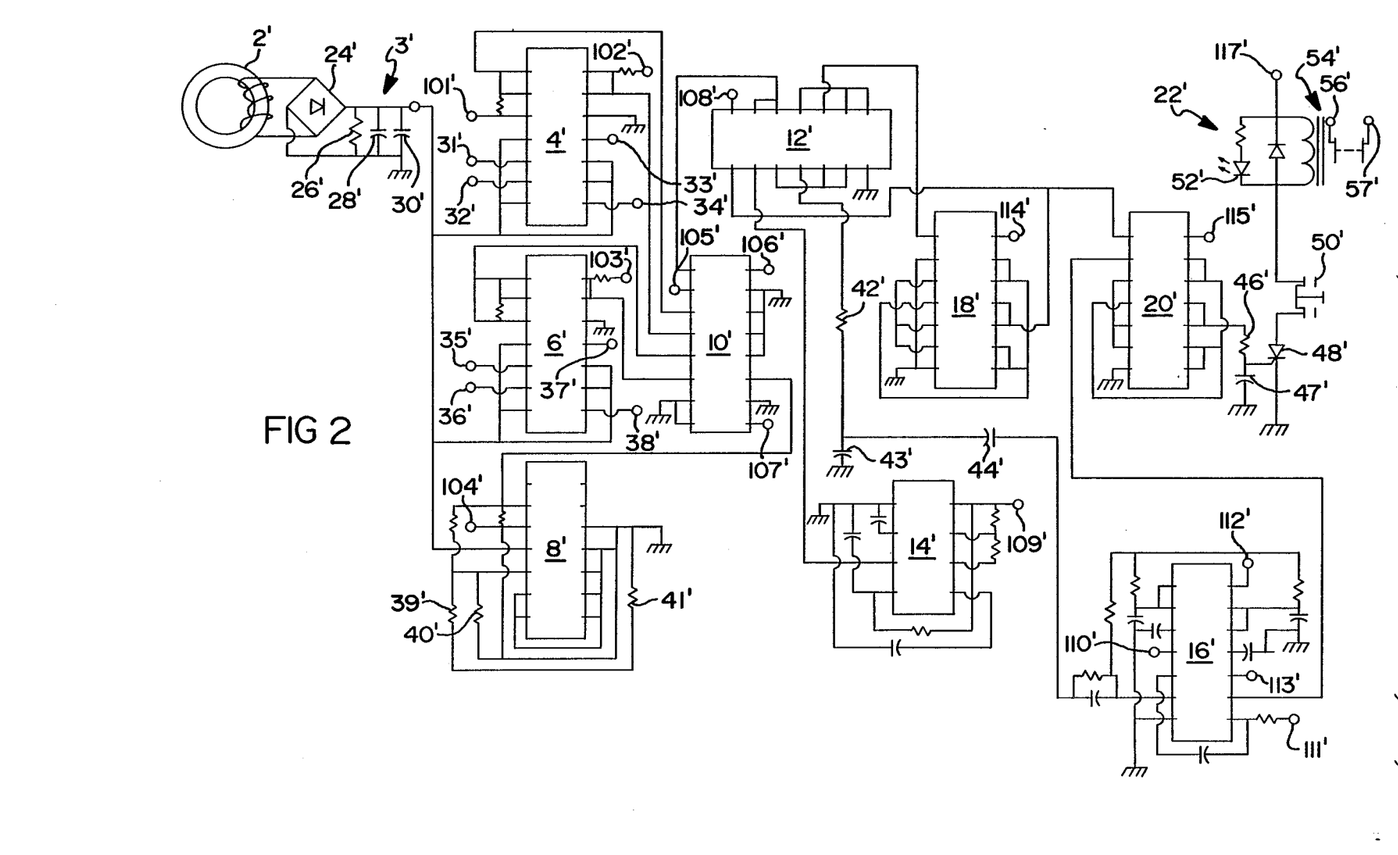
FIG. 2 is a circuit diagram of a first embodiment of a detecting apparatus according to the present invention.

Referring to FIG. 2, there is shown a circuit diagram for the main circuit 1 of an instrument according to a first embodiment of the present invention. The circuit 1 primarily includes a current transformer 2, an input signal conditioner 3, a plurality of window gates 4, 6, 8, a combining logic member 10, a timer logic member 12, a timer trigger 14, a timer 16, detector logic members 18, 20, and an indicator means 22.

The current transformer 2 is a preferred inductive means which is operatively connected to a group of electrical devices and provides an input signal to the rest of the circuit 1 indicative of electrical energy in the electrical devices. The current transformer 2 can, for example, be connected to the group of electrical devices by using a common input line of the electrical devices as the primary winding for the current transformer 2.

As depicted, the input signal conditioner 3 may include a bridge rectifier 24, a resistor 26 and a pair of capacitors 28, 30. However, any other appropriate input signal conditioning means could be used.

Collectively, the window gates 4, 6, 8 and the combining logic member 10 function as a comparator means. Each of the window gates 4, 6, 8 receives a conditioned input signal from the signal conditioner 3 and compares it to one or more predetermined, appropriate ranges of reference values. Particularly, each of window gates 4, 6 would compare the conditioned input signal to two appropriate ranges of reference values, while window gate 8 would compare the conditioned input signal to a single range of reference values.

Figures 1, 4, 5A, 5B:
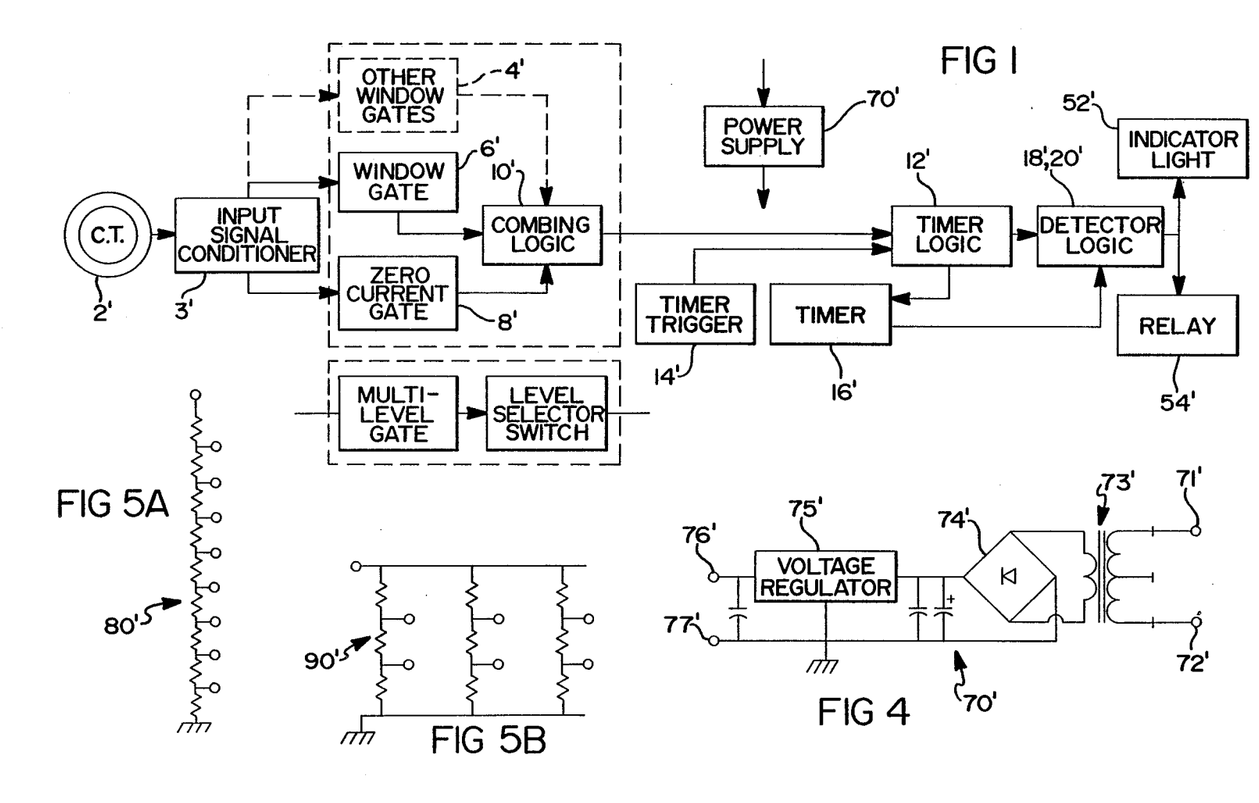
FIG. 1 is a block diagram of the two disclosed embodiments of the invention shown in FIGS. 2 and 3.
FIG. 4 is a circuit diagram of a power supply which can be used with either of the disclosed embodiments of the present invention.
FIGS. 5a and 5b are two different resistor networks which can be used in cooperation with the first embodiment of the present invention, as shown in FIG. 2.

As depicted, the ranges of values used by window gates 4, 6 are preferably set using a resistor network, such as network 80 shown in FIG. 5a or network 90 shown in FIG. 5b, having terminals thereof connected to terminals 31-38 of window gates 4, 6. Similarly, the range of values used by window gate 8 is preferably set using the resistors 39-41. However, it will be understood that the range of reference values for window gate 8 could also be set using resistor network 80 or 90, while any other appropriate range/reference setting means could be used in place of the resistor network 80 or 90 and the resistors 39-41.

In operation, if the conditioned input signal falls outside of any of the reference value ranges of window gates 4, 6, 8, the corresponding gate(s) will send an initial default signal to the combining logic member 10. In turn, the combining logic member 10, which functions as a multiple OR gate, will send a final default signal to the timer logic member 12 if it receives an initial default signal corresponding to initial signals outside of all of the reference value ranges of the window gates 4, 6, 8. In other words, as long as the conditioned input signal falls within one of the reference value ranges the combining logic member will not output a final default signal to the timer logic member 12.

Each of the reference value ranges of the window gates 4, 6, 8 is predetermined to correspond to an electrical energy level that would be normally encountered while a different, given number and type of electrical devices is turned on. For example, the reference value range of window gate 8 could be set to a very low value such as normally encountered when none of the electrical devices is turned on, whereby the window gate 8 would be a zero current gate, and the four reference value ranges of window gates 4, 6 could progressively correspond to electrical energy levels that would be normally encountered when 1, 2, 3 and 4 electrical devices are turned on, respectively.

Alternatively, the window gate 8 could be used as a zero current gate, while each of the four reference value ranges in the window gates 4, 6 could correspond to an electrical energy level that would be normally encountered when a different, whole group of electrical devices was turned on. In this manner, the circuit 1 shown in FIG. 2 is particularly advantageous for monitoring several groups of electrical devices, each group forming a step in a very large bank of the electrical devices which can be selectively and/or progressively turned on as required.

Although three window gates 4, 6, 8 are shown in FIG. 2, it is possible to have substantially any number of the gates. However, where larger numbers of the window gates are used it would be necessary to use a correspondingly increased number of the combining logic members 10.

Also, it is possible to have a separate inductive means associated with each electrical device individually or with each step/group of electrical devices in a large switched bank, and to have an input signal from each such inductive means sent to a separate window gate. However, such arrangement would be unnecessarily bulky and difficult to assemble because of all the separate components and connections.

Further, as a modification to circuit 1, it is contemplated that only one window gate could be used in combination with a means for automatically setting or adjusting the reference value range of the window gate in dependence on which of the electrical devices in a group are turned on. Such automatic setting means could, for example, comprise a pair of variable resistors (one for the upper range limit and the other for the lower range limit), and contactors each individually associated with one of the electrical devices and which would change the upper and lower limits of the variable resistors when the electrical devices are turned on or off.

An appropriate window gate for use in the present invention is a LM339 chip while an appropriate combining logic member is a 4048 chip.

As discussed above, when the combining logic member 10 outputs a final default signal, it is sent to the timing means. The timing means collectively comprises the timing logic member 12, the timer trigger 14 and the timer 16. In operation, the timer trigger 14, which is effectively an oscillator, provides a continuous output to the timer logic member 12. The timer logic member 12, in turn, functions as an AND gate such that when it receives a final default signal from the combining logic member 10 simultaneously with the output signal from the timer trigger 14 it sends a start signal to the timer 16 which, in turn, sends a timer signal to the second detector logic member 20 after a predetermined appropriate time period.

The timer logic member 12 also forwards the final default signal from the combining logic member 10 to the first detector logic member 18, which is a hex inverter buffer. Member 18 in turn sends the final default signal to the second detector logic member 20. The second detector logic member 20 effectively functions as an AND gate such that when it simultaneously receives the default signal from the first detector logic member 18 and the timer signal from the timer 16 it sends an enable signal to the indicator means 22. The first and second detector logic members 18, 20 collectively comprise a detector means.

As will be understood, it is possible to greatly simplify the timer means and the detector means shown in FIG. 2, such as by providing the final default signal directly from the combining logic member 10 to the timer 16 (so that the default signal functions as a start signal) and to the second depictor logic member 20. However, the depicted structure is preferred because it is very reliable. For example, applicant has found that the timer 16 does not reliably start without the use of timer trigger 14.

A preferred timer logic member 10 according to the present invention is a Schmitt trigger, such as a 4093 chip. The Schmitt trigger is preferred because it provides high accuracy with respect to the start signal sent to the timer 16 and the default signal forwarded to the first detector logic member 18. A preferred timer trigger is a 555 chip, a preferred timer is a 556 chip, a preferred first detector logic member is a 4001 chip and the second detector logic member 20 is preferably a 4091 chip.

Resistor 42 and capacitors 43, 44 function to ensure the integrity of the start signal sent from the timer logic member 12 to the timer 16. Similarly, resistor 46 and capacitor 47 function as a filter to prevent any power surges, such as might occur when the instrument or any of the monitored electrical devices is turned on, from improperly enabling the indicator means 22.

Between the second detector logic member 20 and the indicator means 22 there are optionally provided a latching relay 48, such as a 2N5060 SCR, and a reset switch 50. The latching relay 48 ensures that if one of the electrical devices malfunctions for the predetermined time period set by the timer 16, then the indicating means 22 cannot be de-actuated even if the malfunctioning electrical devices should (temporarily) stop malfunctioning. In other words, the latching relay 48 ensures that the present invention will provide an indication that there is or was a malfunction in one of the monitored electrical devices.

The reset switch 50 permits an operator who has observed the indicating means in an enabled state to easily reset the circuit 1 and thereby quickly determine if any of the monitored electrical devices is actually (still) malfunctioning by simply observing whether or not the indicating means 22 is re-enabled after the predetermined time period If the reset switch 50 is not used, it would be necessary for the operator to turn the power supply to circuit 1 off, wait a few seconds, and then turn it back on to reset the circuit, which can be difficult at times if one is running a production line.

The indicator means 22 can include any desired type of indicator or indicators. The depicted indicator means includes LED 52 as an indicator light and a high sensitivity relay 54 which would have the output terminals 56, 57 thereof connected to an audible alarm, a computer control system, etc.

Referring to FIG. 4, there is shown a circuit 70 of an appropriate power supply, such as a low voltage DC power supply, for the main circuit 1 of FIG. 2 The power supply circuit 70 includes input terminals 71, 72 which would be connected to an appropriate power source, such as 480 volts AC, or by selection of appropriate connections on the transformer for any desired voltage, a transformer 73, a bridge rectifier 74, and an appropriate voltage regulator 75, such as a 7815. Output terminals 76, 77 of the power supply circuit 70 are then connected to each of members 4–22 at input terminals 101–117.

A block diagram of circuit 1 is shown in FIG. 1.

Figure 3:
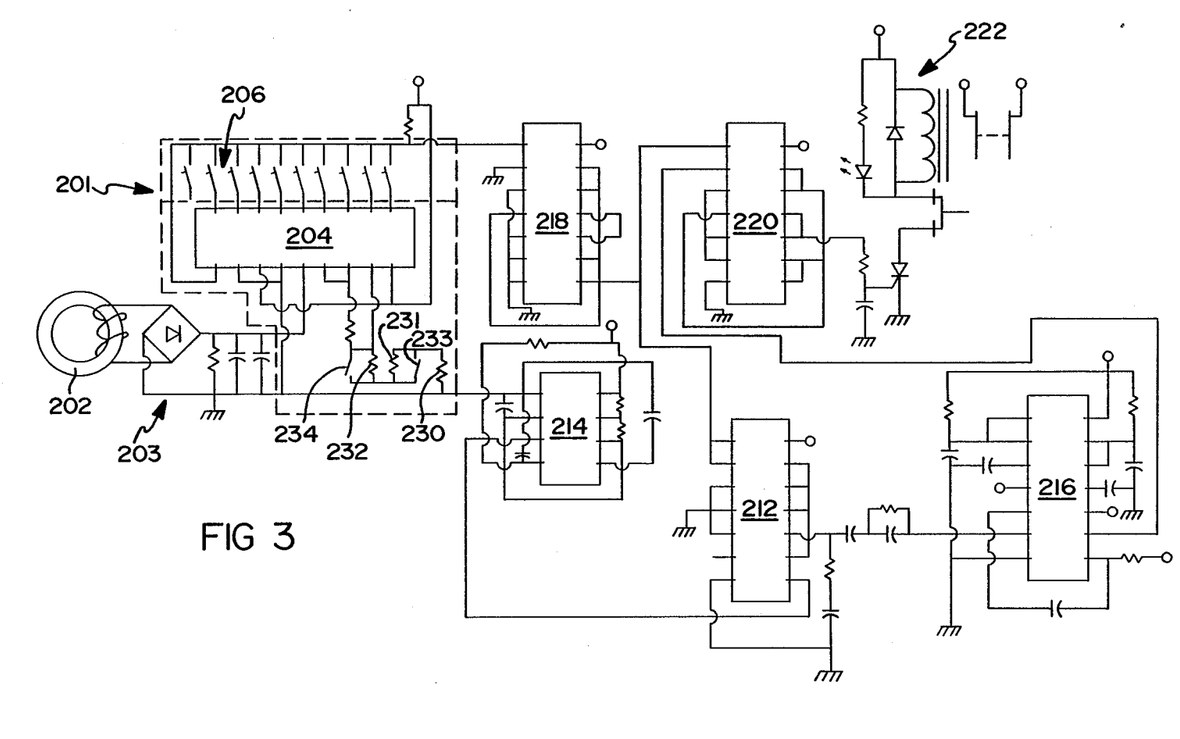
FIG. 3 is a circuit diagram of a second embodiment of a detecting apparatus according to the present invention.

Referring to FIG. 3, there is shown a circuit diagram 201 of a second embodiment of the present invention. As is apparent, the inductive means 202, the input signal conditioner 203, and the indicator means 222 of circuit 201 are identical to the corresponding components of circuit 1. Accordingly, these components will not be discussed again.

Further, the timer means and the detector means of circuit 201 are substantially similar in both structure and function to the corresponding components of circuit 1 except that the first detector logic member 218 is directly connected to the comparator means for receiving a default signal therefrom and passes the default signal to the timer logic member 212, whereas in circuit 1 the timer logic member 12 is directly connected to the comparator means for receiving the default signal therefrom and passes it on to the first detector logic member 18. In both circuits, however, the overall functioning of the timer means and the detector means is substantially the same. For example, the timer logic member 212 in circuit 201 functions as an AND gate and sends a start signal to timer 216, just as timer logic member 12 in circuit 1 functions as an AND gate and sends a start signal to timer 16. Accordingly these portions of circuit 201 will also not be discussed again. A preferred timer logic member 212 for circuit 3 is a 4023 chip.

Thus, the only substantial difference between circuit 1 and circuit 201 is with respect to the comparator means thereof. Particularly, in circuit 201 the comparator means comprises a multilevel gate 204, a level selector switch 206 and a reference value means including resistors 230–232 and switches 233, 234.

The multi-level gate has a plurality of upper outputs (output pins), ten in the depicted embodiment. Each of the upper outputs has a different energy level associated therewith, and these different energy levels will preferably increase in a stepped manner from right to left in FIG. 3.

The multi-level gate 204 cooperates with the reference value setting means and the level selector switch 206 to permit an operator to rapidly adapt the circuit 201 to monitor different energy levels in a group of electrical devices being monitored. Particularly, the switches 233, 234 of the reference value setting means can be selectively opened or closed to vary the overall resistance encountered in the resistors 230, 232 to one of four different values. Each of the four different resistance values can then be associated with each of the upper outputs of the multi-level gate 204 to provide a total of forty different reference energy levels in the depicted embodiment. All of the reference energy levels can be compared by the gate 204 to the energy level of an input signal by selectively opening and closing the switches 233, 234 of the reference value setting means. In turn, a specific one of the upper outputs of the gate 204 will be selectively connected to the rest of the circuit 201 by closing a corresponding one of the switches of the level selector switch 206. In operation, the multi-level gate 204 will pass an output/default signal (indicative of a malfunction of the monitored devices) through a chosen one of the switches of the level selector switch 206 if the energy level of the input signal is less than the reference energy level associated with the corresponding upper output of the gate 204 and with the resistance value established by the reference value setting means. See, for example, Table I below which shows forty significantly different reference energy levels that can be selectively monitored by the circuit of FIG. 3 by appropriately adjusting the level selector switch 206 and the switches 233, 234 of the reference value setting means. Values (in K ohms) of resistors 230, 232 in example of Table I are 2.7, 2.0 and 2.1, respectively.

It will be understood that circuit 201 could also be used to monitor different, individual electrical devices, as well as different groups of electrical devices.

Although there have been described what are at present considered to be the preferred embodiments of the present invention, it will be understood that the invention can be embodied in other specific forms without departing from the spirit or essential characteristics thereof. The described embodiments are, therefore, to be considered in all aspects as illustrative, and not restrictive. The scope of the invention is indicated by the appended claims rather than the foregoing description.

TABLE I

| MINIMUM RELAY OUT CURRENT | SW 234 | SW 231 | \multicolumn{10}{c}{Legs of Level Selector Switch} | RESISTOR VALUE |
|---|---|---|---|---|---|---|---|---|---|---|---|---|---|
| | | | 1 | 2 | 3 | 4 | 5 | 6 | 7 | 8 | 9 | 10 | |
| 13 | 1 | 1 | 1 | 0 | 0 | 0 | 0 | 0 | 0 | 0 | 0 | 0 | 2.7K |
| 19 | 1 | 0 | 1 | 0 | 0 | 0 | 0 | 0 | 0 | 0 | 0 | 0 | 4.7K |
| 20 | 0 | 1 | 1 | 0 | 0 | 0 | 0 | 0 | 0 | 0 | 0 | 0 | 4.8K |
| 24 | 1 | 1 | 0 | 1 | 0 | 0 | 0 | 0 | 0 | 0 | 0 | 0 | 2.7K |
| 25 | 0 | 0 | 1 | 0 | 0 | 0 | 0 | 0 | 0 | 0 | 0 | 0 | 6.8K |
| 36 | 1 | 0 | 0 | 1 | 0 | 0 | 0 | 0 | 0 | 0 | 0 | 0 | 4.7K |
| 36 | 1 | 1 | 0 | 0 | 1 | 0 | 0 | 0 | 0 | 0 | 0 | 0 | 2.7K |
| 37 | 0 | 1 | 0 | 1 | 0 | 0 | 0 | 0 | 0 | 0 | 0 | 0 | 4.8K |
| 47 | 1 | 1 | 0 | 0 | 0 | 1 | 0 | 0 | 0 | 0 | 0 | 0 | 2.7K |
| 49 | 0 | 0 | 0 | 1 | 0 | 0 | 0 | 0 | 0 | 0 | 0 | 0 | 6.8K |
| 54 | 1 | 0 | 0 | 0 | 1 | 0 | 0 | 0 | 0 | 0 | 0 | 0 | 4.7K |
| 55 | 0 | 1 | 0 | 0 | 1 | 0 | 0 | 0 | 0 | 0 | 0 | 0 | 4.8K |
| 58 | 1 | 1 | 0 | 0 | 0 | 0 | 1 | 0 | 0 | 0 | 0 | 0 | 2.7K |
| 70 | 1 | 1 | 0 | 0 | 0 | 0 | 0 | 1 | 0 | 0 | 0 | 0 | 2.7K |
| 71 | 1 | 0 | 0 | 0 | 0 | 1 | 0 | 0 | 0 | 0 | 0 | 0 | 4.7K |
| 72 | 0 | 1 | 0 | 0 | 0 | 1 | 0 | 0 | 0 | 0 | 0 | 0 | 4.8K |
| 75 | 0 | 0 | 0 | 0 | 1 | 0 | 0 | 0 | 0 | 0 | 0 | 0 | 6.8K |
| 80 | 1 | 1 | 0 | 0 | 0 | 0 | 0 | 0 | 1 | 0 | 0 | 0 | 2.7K |
| 88 | 1 | 0 | 0 | 0 | 0 | 0 | 1 | 0 | 0 | 0 | 0 | 0 | 4.7K |
| 90 | 0 | 1 | 0 | 0 | 0 | 0 | 1 | 0 | 0 | 0 | 0 | 0 | 4.8K |
| 91 | 1 | 1 | 0 | 0 | 0 | 0 | 0 | 0 | 1 | 0 | 0 | 0 | 2.7K |
| 97 | 0 | 0 | 0 | 0 | 0 | 1 | 0 | 0 | 0 | 0 | 0 | 0 | 6.8K |
| 102 | 1 | 1 | 0 | 0 | 0 | 0 | 0 | 0 | 0 | 0 | 1 | 0 | 2.7K |
| 106 | 1 | 0 | 0 | 0 | 0 | 0 | 0 | 1 | 0 | 0 | 0 | 0 | 4.7K |
| 107 | 0 | 1 | 0 | 0 | 0 | 0 | 0 | 1 | 0 | 0 | 0 | 0 | 4.8K |
| 112 | 1 | 1 | 0 | 0 | 0 | 0 | 0 | 0 | 0 | 0 | 0 | 1 | 2.7K |
| 121 | 0 | 0 | 0 | 0 | 0 | 0 | 1 | 0 | 0 | 0 | 0 | 0 | 6.8K |
| 123 | 1 | 0 | 0 | 0 | 0 | 0 | 0 | 0 | 1 | 0 | 0 | 0 | 4.7K |
| 125 | 0 | 1 | 0 | 0 | 0 | 0 | 0 | 0 | 1 | 0 | 0 | 0 | 4.8K |
| 140 | 1 | 0 | 0 | 0 | 0 | 0 | 0 | 0 | 0 | 1 | 0 | 0 | 4.7K |
| 142 | 0 | 1 | 0 | 0 | 0 | 0 | 0 | 0 | 0 | 1 | 0 | 0 | 4.8K |
| 144 | 0 | 0 | 0 | 0 | 0 | 0 | 0 | 1 | 0 | 0 | 0 | 0 | 6.8K |

TABLE I-continued

| MINIMUM RELAY OUT CURRENT | SW 234 | SW 231 | Legs of Level Selector Switch | | | | | | | | | | RESISTOR VALUE |
|---|---|---|---|---|---|---|---|---|---|---|---|---|---|
| | | | 1 | 2 | 3 | 4 | 5 | 6 | 7 | 8 | 9 | 10 | |
| 157 | 1 | 0 | 0 | 0 | 0 | 0 | 0 | 0 | 0 | 0 | 1 | 0 | 4.7K |
| 159 | 0 | 1 | 0 | 0 | 0 | 0 | 0 | 0 | 0 | 0 | 1 | 0 | 4.8K |
| 168 | 0 | 0 | 0 | 0 | 0 | 0 | 0 | 0 | 1 | 0 | 0 | 0 | 6.8K |
| 174 | 1 | 0 | 0 | 0 | 0 | 0 | 0 | 0 | 0 | 0 | 0 | 1 | 4.7K |
| 177 | 0 | 1 | 0 | 0 | 0 | 0 | 0 | 0 | 0 | 0 | 0 | 1 | 4.8K |
| 192 | 0 | 0 | 0 | 0 | 0 | 0 | 0 | 0 | 0 | 1 | 0 | 0 | 6.8K |
| 225 | 0 | 0 | 0 | 0 | 0 | 0 | 0 | 0 | 0 | 0 | 1 | 0 | 6.8K |
| 241 | 0 | 0 | 0 | 0 | 0 | 0 | 0 | 0 | 0 | 0 | 0 | 1 | 6.8K |

We claim:

1. Apparatus for detecting malfunctions of at least one electrical device in a group of electrical devices, comprising:
   inductive means operatively connected to a group of electrical devices and providing an input signal indicative of electrical energy in said group of electrical devices;
   comparator means operatively connected to said inductive means for comparing said input signal to at least one predetermined reference value indicative of proper functioning of said group of electrical devices, said comparator means providing a default signal if a value of said input signal is less than each said predetermined reference value, respectively;
   indicator means for indicating if at least one of said electrical devices is malfunctioning based on said default signal of said comparator means; and
   power supply means for providing power to said apparatus.

2. Apparatus according to claim 1, wherein:
   said inductive means is connected to a common output of said group of electrical devices.

3. Detecting apparatus according to claim 1, wherein said comparator means comprises at least one window gate, said window gate providing the default signal when a value of said input signal falls below a predetermined range of reference values associated therewith.

4. A detecting apparatus according to claim 1, wherein:
   the predetermined range of reference values of one of the window gates is very low so that said one window gate can detect if the electrical devices are properly functioning even if none of the devices are turned on.

5. A detecting apparatus according to claim 1, wherein:
   said comparator means comprises a multi-level gate and a level selector switch;
   said multi-level gate being adapted to compare said input signal to a plurality of stepped outputs relating to many different reference energy values, and to provide output signals corresponding to each such comparison, respectively; and
   said level selector switch being adapted to permit any one of said output signals of said multi-level gate to be selectively chosen as a basis of said default signal of said comparator means.

6. A detecting apparatus according to claim 5, wherein:
   said comparator means further comprises a reference value setting means for selectively varying the reference energy values associated with said stepped outputs of said multi-level gate.

7. A detecting apparatus according to claim 6, wherein:
   said reference value setting means includes at least one switch; and
   said level selector switch and said reference setting means being adapted to be selectively preset to correspond to different groups of electrical devices.

8. A detecting apparatus according to claim 5, wherein:
   said comparator means being adapted to provide said default signal when the energy level of said input signal is less than the reference energy level of the stepped output of said multi-level gate selected by said level selector switch.

9. A detecting apparatus according to claim 1, wherein:
   said power supply means is an independent power supply means.

10. Apparatus for detecting malfunctions of an electrical device, comprising:
    inductive means operatively connected to an electrical device for providing an input signal corresponding to electrical energy in the electrical device;
    comparator means operatively connected to said inductive means and receiving said input signal therefrom, said comparator means being adapted to compare a value of said input signal to a predetermined reference value and to output a default signal when the value of said input signal is less than said predetermined reference value;
    said comparator means including an adjustment means which can be rapidly, selectively set to numerous positions to thereby adapt the detecting apparatus for selectively monitoring many different electrical devices which normally operate at many significantly different energy levels.

11. A detecting apparatus according to claim 10, wherein:
    said adjustment means comprises a multi-level gate and a level selector switch;
    said multi-level gate being adapted to compare said input signal to a plurality of stepped outputs relating to different reference energy values, and to provide output signals corresponding to each such comparison, respectively; and
    said level selector switch being adapted to permit any one of said output signals to be selectively chosen as a basis of said default signal of said comparator means.

12. A detecting apparatus according to claim 11, wherein:
    said comparator means further comprises a reference value setting means for selectively varying the reference energy values associated with the stepped outputs of said multi-level gate.

13. Apparatus for detecting malfunctions of at least one electrical device in a group of electrical devices, comprising:
   inductive means operatively connected to a group of electrical devices and providing an input signal indicative of electrical energy in said group of electrical devices;
   comparator means operatively connected to said inductive means for comparing said input signal to at least one predetermined reference value indicative of proper functioning of said group of electrical devices, said comparator means providing a default signal if a value of said input signal is less than each said predetermined reference value, respectively;
   said comparator means comprises a plurality of window gates and a combining logic means;
   each of said window gates having a different predetermined range of reference values associated therewith, each of said window gate receiving said input signal from said inductive means, and each said window gate providing an initial default signal to said combining logic means when the value of the input signal falls outside of its predetermined range of reference value;
   said combining logic means providing a final default signal whenever it receives initial default signals from all of the window gates;
   indicator means for indicating if at least one of said electrical devices is malfunctioning based on said default signal of said comparator means; and
   power supply means for providing power to said apparatus.

14. A detecting apparatus according to claim 13, wherein:
   said comparator means further comprises a combined setting means for setting more than one of the different reference value ranges of said window gates.

15. A detecting apparatus according to claim 14, wherein:
   combined setting means is a resistor network.

16. Apparatus for detecting malfunctions of at least one electrical device in a group of electrical devices, each electrical device adapted to be selectively turned on, comprising:
   inductive means operatively connected to a group of electrical devices and providing an input signal indicative of electrical energy in said group of electrical devices;
   comparator means operatively connected to said inductive means for comparing said input signal to at least one predetermined reference value indicative of proper functioning of said group of electrical devices, said comparator means providing a default signal if a value of said input signal is less than each said predetermined reference value, respectively, said comparator means further comprises at least one window gate, said window gate providing said default signal when a value of said input signal falls below a predetermined range of reference values associated therewith, and said comparator means further comprising a range setting means connected between said window gate and said group of electrical devices, said range setting means being adapted to change upper and lower parameters of said predetermined range of reference values independent on which of the electrical devices are turned on;
   indicator means for indicating if at least one of said electrical devices is malfunctioning based on said default signal of said comparator means; and
   power supply means for providing power to said apparatus.

17. Apparatus for detecting malfunctions of at least one electrical device in a group of electrical devices, comprising:
   inductive means operatively connected to a group of electrical devices and providing an input signal indicative of electrical energy in said group of electrical devices;
   comparator means operatively connected to said inductive means for comparing said input signal to at least one predetermined reference value indicative of proper functioning of said group of electrical devices, said comparator means providing a default signal if a value of said input signal is less than each said predetermined reference value, respectively;
   detector means for receiving said default signal from said comparator means and for providing an enable signal to said indicator means based on said default signal;
   timer means operatively connected to said comparator means and to said detector means, said timer means being adapted to be actuated upon receiving the default signal from said comparator means and to provide a timer signal to said detector means a predetermined time thereafter;
   said detector means being adapted to provide said enable signal to said indicator means only if it receives said default signal and said timer signal simultaneously;
   indicator means for indicating if at least one of the electrical devices is malfunctioning based on said default signal of said comparator means; and
   power supply means for providing power to said apparatus.

18. A detecting apparatus according to claim 17, wherein:
   said timer means comprises a timer trigger, a timer logic member, and a timer;
   said timer trigger being adapted to provide a continuous output to said timer logic member; and
   said timer logic member being adapted to provide a start signal to said timer when it receives the default signal from the comparator means simultaneously with the continuous output from the timer trigger.

19. A detecting apparatus according to claim 17, wherein:
   said apparatus further comprises a latching relay interconnected between said detector means and said indicating means, said latching relay being adapted to latch onto said enabling signal as provided from said detector means to said indicating means.

20. Apparatus for detecting malfunctions of an electrical device, comprising:
   inductive means operatively connected to an electrical device for providing an input signal corresponding to electrical energy in the electrical device;
   comparator means operatively connected to said inductive means and receiving said input signal therefrom, said comparator means being adapted to compare a value of said input signal to a predetermined reference value and to output a default signal when the value of said input signal is less than said predetermined reference value;

said comparator means including an adjustment means which can be rapidly, selectively set to numerous positions to thereby adapt the detecting apparatus for selectively monitoring many different electrical devices which normally operate at many significantly different energy levels;

detector means operatively connected to said comparator means and receiving the default signal when therefrom;

timer means operatively connected to said comparator means and to said detector means, said timer means being adapted to be actuated upon receiving the default signal from said comparator means and to provide a timer signal to said detector means a predetermined time thereafter; and indicator means operatively connected to said detector means and receiving an enable signal therefrom;

said detector means being adapted to provide said enable signal to said indicator means only if it receives said default signal and said timer signal simultaneously.

* * * * *

UNITED STATES PATENT AND TRADEMARK OFFICE
CERTIFICATE OF CORRECTION

PATENT NO. : 4,968,944

DATED : NOVEMBER 6, 1990

INVENTOR(S) : MYRON ZUCKER, MICHAEL Z. LOWENSTEIN, AND RONALD G. JAWERNYCKY

It is certified that error appears in the above-identified patent and that said Letters Patent is hereby corrected as shown below:

COLUMN 4, line 43 after "member" insert --10--.

COLUMN 5, line 67 change "member 10" to --member 12--.

COLUMN 6, line 34 after "time period" insert --.--.

Signed and Sealed this

Nineteenth Day of May, 1992

*Attest:*

DOUGLAS B. COMER

*Attesting Officer*  *Acting Commissioner of Patents and Trademarks*